United States Patent [19]
Brown

[11] 3,838,751
[45] Oct. 1, 1974

[54] AXLE LUBRICATION SYSTEM
[75] Inventor: Danny D. Brown, Berea, Ohio
[73] Assignee: Eaton Corporation, Cleveland, Ohio
[22] Filed: Aug. 6, 1973
[21] Appl. No.: 386,145

[52] U.S. Cl.............. 184/6.12, 74/710, 184/11 A
[51] Int. Cl............................................. F01m 9/00
[58] Field of Search..... 184/6.12, 11 R, 11 A, 13 R; 74/710, 607

[56] References Cited
UNITED STATES PATENTS

| | | | |
|---|---|---|---|
| 3,029,661 | 4/1962 | Schmitter | 184/6.12 |
| 3,097,546 | 7/1963 | Kelbel | 184/6.12 |
| 3,131,582 | 5/1964 | Kelbel | 184/6.12 |
| 3,162,269 | 12/1964 | Reed | 184/6.12 |
| 3,441,106 | 4/1969 | Taylor | 184/6.12 |
| 3,539,035 | 11/1970 | Wolkenstein | 184/6.12 |
| 3,587,783 | 6/1971 | Walters | 184/13 R |
| 3,719,253 | 3/1973 | Dukes | 184/6.12 |
| 3,741,343 | 6/1973 | Lindenfield | 184/6.12 |

Primary Examiner—Manuel A. Antonakas
Assistant Examiner—Daniel J. O'Connor
Attorney, Agent, or Firm—Teagno & Toddy

[57] ABSTRACT

A universal axle mechanism is provided by an especially configured differential carrier housing which can be mounted to an axle housing with the axle housing orientated either upside down or right-side up and in each axle position lubricate the axle mechanism when the axle is driven in either a forward or rearward direction. The carrier housing includes several cored passageways within the carrier housing communicating with a common passageway leading to the axle differential. In each axle housing position, the common passageway is maintained out of direct communication with the sump. Lubricant is directed into the several passageways and to the common passageway by means of either a pick-up director member, the pinion drive gear or the ring gear; the lubricant following different flow paths into selective passageways leading to the differential dependent upon the driven direction of the axle and the axle mounting position.

11 Claims, 8 Drawing Figures

AXLE LUBRICATION SYSTEM

This invention relates generally to axle mechanisms and more particularly to an axle lubrication system established, in part, by the axle differential carrier housing.

The invention is particularly applicable to axle mechanisms of the type employed in relatively heavy vehicles such as on-highway, off-highway trucks, tractors, buses and the like and will be described with particular reference thereto. However it will be appreciated that the invention may have broader applications and may be applied to automotive vehicles and other motion transmitting axle drive mechanisms.

A lubrication system of which this invention may be viewed as an improvement thereof is disclosed in U.S. Pat. No. 3,441,106. Briefly, the lubrication system disclosed therein included a passageway in a differential bearing support member located at the rear of the carrier housing which communicated with an opening in the differential case. In a forward direction, oil is scraped from the differential case as it rotates partially submerged in the sump by means of a pick-up director member which directs the lubricant into the passageway. When the axle mechanism was driven in a rearward direction, oil was thrown into the cored passage from the drive pinion gear.

Such arrangement provides an effective lubrication system when the carrier and axle housings are orientated rightside up and the axle housing positioned rearwardly of the vehicle drive. However when the axle housing is mounted ahead of the drive line, as are front drive-steer axles or bus axle applications, the lubrication system becomes inoperative. That is, in such installations, it is desirable to mount the differential carrier housing on the axle housing and invert the axle housing to an upside down position whereby gear rotation will be reversed to assure proper forward and rearward drive of the axle mechanism. In such arrangement, the carrier housing is upside down and the aforementioned passageway therein is open to the sump. With the axle driven in a forward direction the pickup is inoperative to direct lubricant into the cored passageway and the differential becomes starved of lubricant, although at high forward speeds the sump level may slightly rise to provide an insignificant amount of lubricant in the passageway. When the axle is driven in a rearward direction, the drive pinion gear throws the lubricant away from the cored passage back to the sump. In either rotational direction, failure of the differential, because of insufficient lubrication, occurred in a relatively short time. Furthermore, obvious alterations of such systems to lubricate same, such as by increasing the sump level, provide only marginal lubrication and could result in failure of some axle components because of frothing, heat buildup, etc.

It is thus an object of the subject invention to provide an improved lubricating arrangement for use with an axle mechanism which permits the axle housing differential carrier housing bolted thereto to be mounted in either an upside down or right-side up position.

In accordance with the invention this object is achieved by providing an especially configured carrier housing which includes a semi-circular differential bearing support member at its rearward end having a longitudinally extending, open-ended first passageway therein which communicates with an opening in a differential case in a manner similar to that described above. The housing includes several additional passageways and an opening communicating with the first passageway. The additional passageways and opening provide different lubricant flow paths to the first passageway, selective flow paths established and dependent upon the particular mounting position of the carrier housing and the driven direction of the axle mechanism. Lubricant flow in a right-side up, forward direction remains the same as prior art in that a first pick-up director member scrapes fluid from the rotating differential case and directs same into the first flow passageway through the opening therein. The remaining flow paths are believed to differ from that of prior art.

Accordingly another feature of the subject invention resides in a vertically extending angular wall within the carrier housing which functions to prevent the oil level in the first passageway falling to the sump level when the carrier and axle housings are mounted upside down while also partly defining a second passageway communicating with the first passageway. Lubricant is picked up from the sump by the drive pinion gear and eventually directed into the second passageway and from thence to the first passage when the axle mechanism is driven in both forward and rearward directions.

In accordance with another aspect of the subject invention a horizontally orientated wall, continuous with the angular wall, defines a third passageway between the interior surface of the exterior portion of the housing and the upper surface of the horizontal wall. The third passageway leads to the opening in the first passageway. When the carrier housing is mounted in a right-side up position and the axle mechanism is driven in a rearward direction, lubricant is picked up from the sump by the ring gear and directed into the third passageway and from thence to the first passageway.

In accordance with still another aspect of the subject invention, additional lubricant flow in an upside down carrier mounting position with the axle mechanism driven in a rearward direction is achieved in certain applications by means of a second pick-up member directing flow from the differential case into a fourth passageway formed in the carrier housing. Lubricant flow falls by gravity from the fourth flow passageway to the second flow passageway which in turn communicates with the first flow passageway.

It is thus another object of the subject invention to provide an axle mechanism possessing universal lubricating means for lubricating its component parts independent of the orientation of the component parts therein.

The invention may take physical form in certain parts and arrangement of parts, a preferred embodiment of which will be described in detail herein and illustrated in the accompanying drawings which form a part hereof and wherein:

FIG. 8 is a sectioned elevation view of the carrier housing taken along Line 8—8 of FIG. 4.

Figure 1:
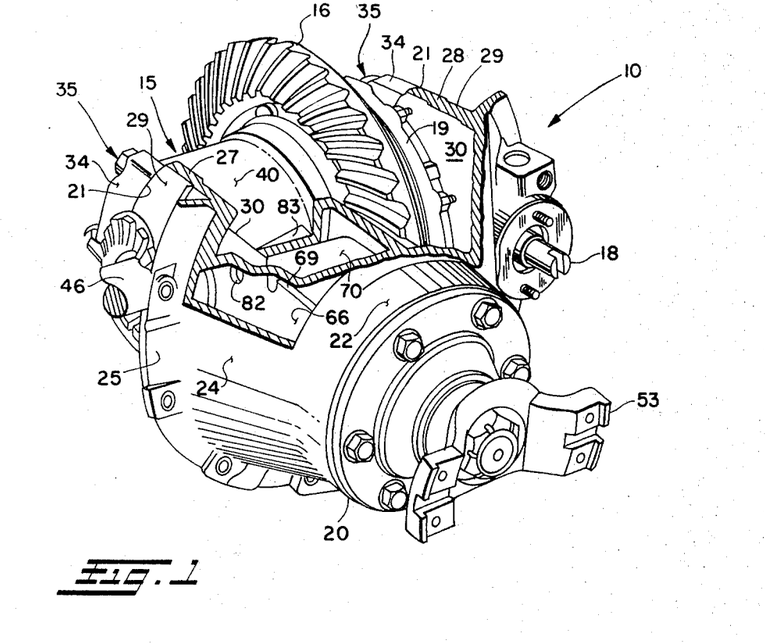
FIG. 1 is a perspective view of the axle mechanism of the subject invention with certain parts broken away to show certain lubricant flow passageways.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer respectively to the front and rear ends of the axle mechanism as same is conventionally mounted in the vehicle, being respectively the left and right side of the axle mechanism as illustrated in FIG. 1 and the top and bottom sides of the mechanism shown in FIG. 2. The words "inwardly" and "outwardly" will refer to directions toward and away from, respectively, the geometric drive center of the device and designated parts thereof. Said terminology will include the words above specifically mentioned, derivatives thereof and words of similar import.

Figure 2:
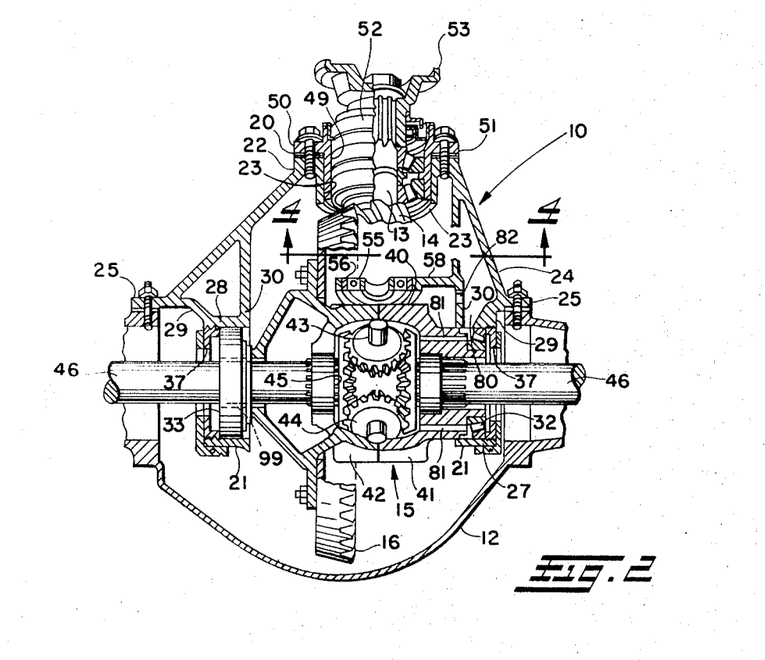
FIG. 2 is a top plan view of an axle mechanism with certain parts broken away to illustrate the component parts and certain lubricant flow passageways.

Referring now to the drawings wherein the showings are for the purpose of illustrating a preferred embodiment of the invention only and not for the purpose of limiting same, there is shown in FIG. 1 a multispeed axle differential carrier housing 10 and in FIG. 2 a single reduction axle differential carrier housing 10, both types of carrier housings embodying the features of the subject invention. The carrier housing is adapted to be mounted to a conventional banjo-type axle housing 12 and carrier or provides support for the axle drive mechanism which includes a drive pinion shaft 13 having a drive pinion gear 14 thereon, an axle differential unit 15 and a ring gear 16 in meshing, driving engagement with the pinion gear 14.

The carrier housing, as best shown in FIGS. 1 and 2, includes a forward end 20 and rearward end 21. The exterior configuration of the carrier housing may best be defined as including an annular pinion bearing support portion 22 at the carrier forward end 20 which accordingly defines a pinion bearing opening 23 at the housing forward end. A generally flat, peripherally extending frusto-conical wall portion 24 diverges from the annular bearing support portion 22 and converges into an annular mounting flange portion 25 whereby the carrier housing 10 is bolted to the axle housing 12. At the rearward end 21 of the carrier housing are first and second semi-circular differential bearing support members 27,28 respectively. Differential bearing supports 27,28 as best shown in FIG. 1 are orientated generally vertically and extend longitudinally toward the carrier housing forward end 20. More particularly, each differential bearing support 27,28 has an outwardly disposed, longitudinally extending wall surface 29 which blends with the annular mounting flange 25 and an inwardly disposed, longitudinally extending wall surface 30 which blends with internal structure of the carrier housing as will be described hereafter.

First and second differential bearing supports 27,28 respectively receive first and second differential bearings 32,33. Each differential bearing is secured to its respective bearing support by means of a semi-circular differential bearing cap 34 clamped to the bearing support by cap screws 35 (FIG. 1). Each differential bearing is adjusted or preloaded by means of a threaded bearing adjuster member 37 in threaded engagement with the outwardly disposed portion of the bearing supports which abuts the cup of each differential bearing (FIG. 2).

Differential bearings 32,33 journal the axle differential 15 which is shown herein to be of the conventional type although it will be recognized by those skilled in the art that other types of differentials, such as those of the limited slip type, may be employed herein. The differential illustrated thus includes a generally cylindrical differential case 40 comprising a right hand plane half 41 journalled within the first differential bearing 32 and a left hand flanged half 42 which carries the ring gear and is bolted to the right hand half 41. The differential case 40 houses a spider 43 carrying side pinion gears 44 which in turn mesh with side gears 45. Side gears 45 are splined to the axle shafts or output members 46.

The carrier housing 10 also supports the drive pinion shaft 13 within opening 23 defined by the annular pinion bearing support portion 22 at the carrier forward end 20 in the conventional manner. That is a hollow cylindrical bearing cage 49 is received within opening 23 and held therein by means of a bearing cage flange 50 bolted as at 51 to the forward end 20 of the carrier housing (FIG. 2). Bearing cage 49 receives a drive pinion bearing arrangement 52 whereby a companion flange 53 splined to pinion shaft 13 and the pinion shaft are both journalled in the bearing cage 49 at the forward end 20 of carrier housing 10. Drive pinion shaft 13 has a pilot bearing end (not shown) which is journalled in a pinion pilot bearing 55. Pilot bearing 55 is pressed into an opening 56 formed in a horizontally orientated middle wall portion 58 located within the interior of the carrier housing and pilot bearing opening 56 is generally aligned with pinion bearing opening 23 (FIG. 3).

Figure 3:
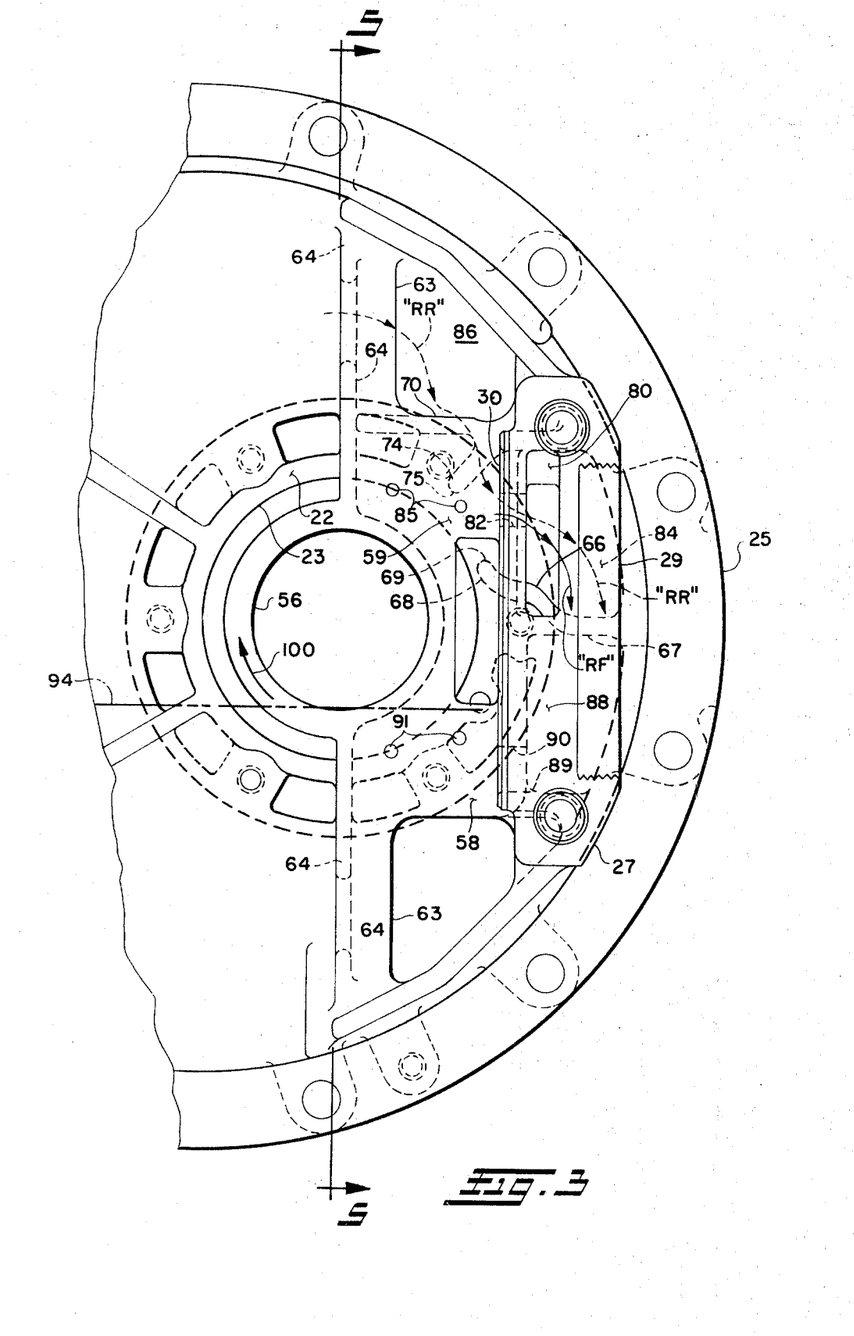
FIG. 3 is a plan elevation view of the rear of the differential carrier housing.
Figures 4, 5:
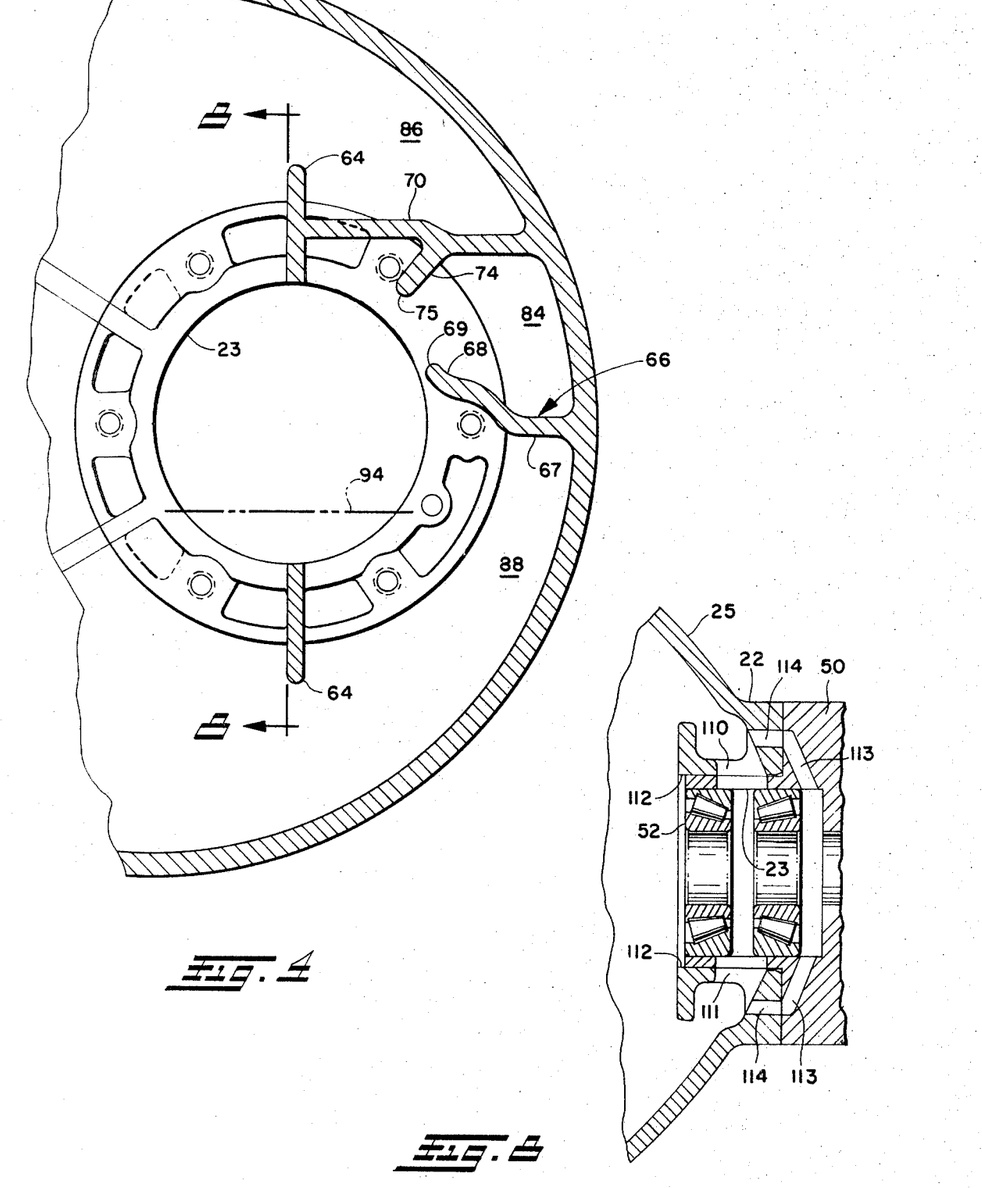
FIG. 4 is a sectioned plan view of the carrier housing taken generally along Line 4—4 of FIG. 2.
FIG. 5 is a sectioned elevation view of the carrier housing taken along Line 5—5 of FIG. 3.
Figure 5:
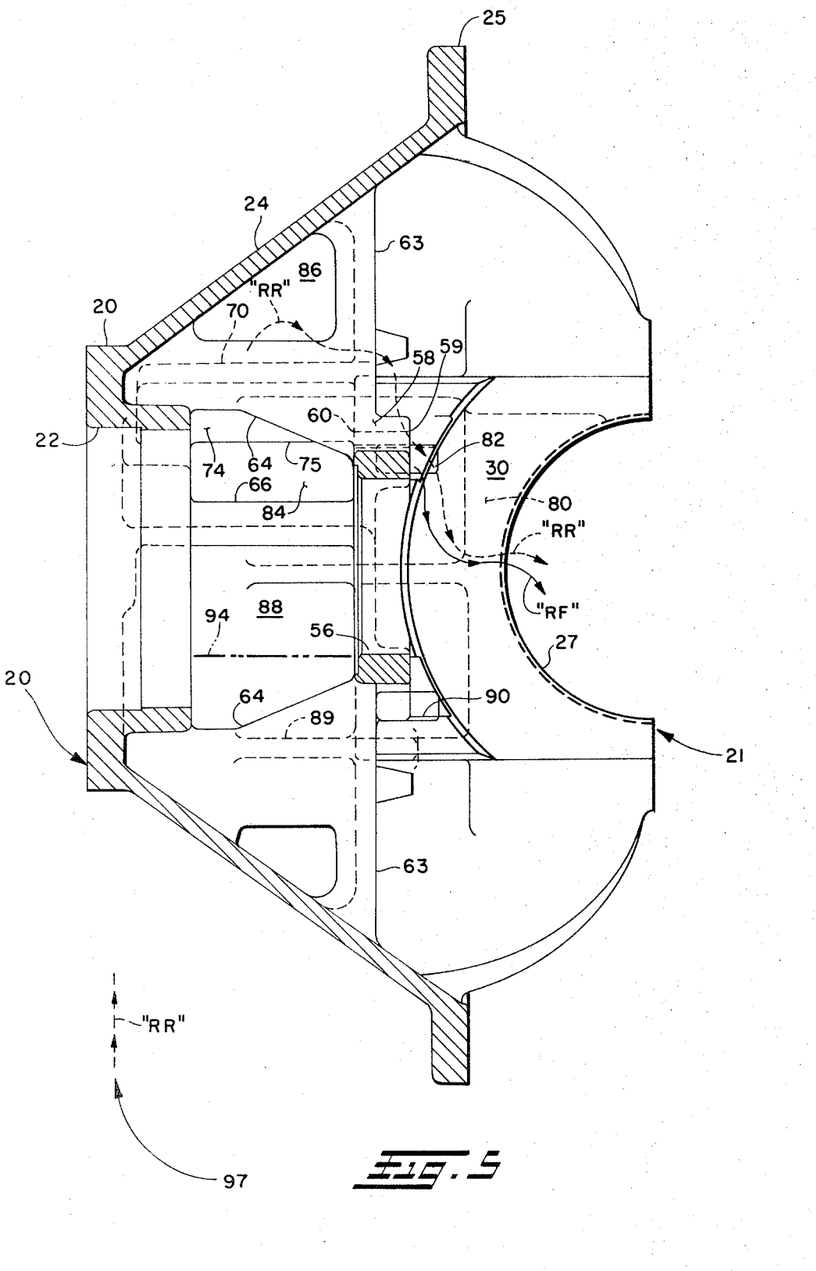

Referring now to FIGS. 3, 4 and 5 for a description of the interior configuration of the carrier housing, reference to the orientation of such structure will be made with the carrier housing assumed mounted to the axle housing in a rightside up position. Middle wall portion 58 has a rearwardly facing surface 59 which blends at its horizontal extremity with the inwardly disposed longitudinally extending wall surface 30 of the first bearing support member 27. Middle wall portion 58 also has a forwardly facing surface 60 which blends with a pair of oppositely extending, vertical ribs 63 which in turn are continuous with the interior surface of the frusto-conical wall 24. Also blending with forwardly facing, middle wall surface 60 are a pair of oppositely disposed, longitudinally orientated ribs 64 which extend to and blend with the forward end 20 of the carrier housing. Vertical and longitudinal ribs 63,64 provide means for supporting middle wall portion 58 against deflection under pinion gear loads.

Also continuous with the forwardly facing surface 60 of middle wall portion 58 are first wall means which comprise a first longitudinally orientated wall 66 extending between and continuous with the annular pinion bearing support 22 at the forward end of the housing and the forwardly facing middle wall surface 60. First longitudinal wall 66 may best be defined as having first and second continuous portions 67,68 respectively. First continuous portion 67 extends horizontally from the interior of the frusto-conical wall portion 24 and is generally coplanar with the horizontal centerline of pinion bearing opening 23 and pilot bearing opening 56. The second continuous portion 68 projects vertically upwardly from the first continuous portion 67 and more particularly extends upwardly about a curvilinear path which path is specifically defined as being radial and concentric with the pinion bearing opening 23 and pilot bearing opening 56. Second continuous portion 68 ends in an exposed longitudinally extending, edge surface designated as 69.

The interior configuration of the carrier housing 10 further includes second wall means disposed vertically above the first wall means. The second wall means includes a horizontally orientated wall 70 continuous with the upper extremity of the forwardly facing surface 60 of middle wall portion 58 and extending horizontally from the interior surface of the frusto-conical carrier portion 24 until intersecting with the upper longitudinal rib 64. Horizontal wall 70 extends parallel with upper longitudinal rib 64 between the forward end 20 of the carrier housing and the forwardly facing surface 60 of the middle wall portion. The second wall means also includes an angular wall 74 which extends from the forward end 20 of the carrier housing to the forwardly facing surface 60 of the middle wall portion and is continuous with horizontal wall 70 at the juncture of that wall with the interior surface of the frusto-conical wall 24. Angular wall 74 extends horizontally and vertically downwardly to project generally towards the center of the pinion bearing opening 23 and pinion pilot bearing opening 56. As with the first longitudinally extending wall 66, angular wall 74 likewise terminates in an exposed longitudinally extending edge surface 75 which importantly projects at a greater horizontal distance from the interior surface to the frusto-conical wall portion 24 than does the longitudinally extending edge surface 69 of the first longitudinal wall 66 for reasons which will be explained hereafter.

The aforementioned carrier housing configuration provides four different lubricant flow paths to the differential 15 and its associated bearings 32,33 which will hereafter be designated as "RF," "RR," "UF," and "UR" to indicate the carrier mounting position and axle driven direction as right-side up forward, right-side up reverse, upside down forward, and upside down reverse, respectively. To provide for these flow paths lubricant must flow through several passageways formed in the interior of the above described structure. These passageways include a first flow passageway 80 which is defined as an open-ended passageway longitudinally extending through first differential support member 27 between the wall surfaces 29,30 thereof. Thus first flow passageway 80 opens at the rearward end 21 of the carrier housing and, as shown in FIG. 2, is in fluid communication with an opening 81 in the right hand differential case half 41. One source of fluid communication with first flow passageway 80 is by means of a slot 82 in the inwardly disposed longitudinally extending wall surface 30 of the first differential bearing support 27. Slot 82 is located near the intersection of the rearwardly facing, middle wall surface 59 and is adapted to cooperate with a first pick-up director member shown as 83 in FIG. 1. First pick-up director member 83 is mounted to a pair of first mounting holes 85 (FIG. 3) on the rearwardly facing middle wall surface 59. The pick-up director is a rubberized angled member known in the art and so not shown further in detail herein.

A second fluid flow passageway 84 is defined as that space between the interior surface of the frusto-conical wall portion 24, angular wall 74, the first longitudinally orientated wall 66 and the forwardly facing middle wall surface 60. Second fluid flow passageway 84 directly communicates with the forward opening of first fluid flow passageway 80 which in turn is defined to be coplanar with middle wall portion 60. A third fluid flow passageway 86 is defined as that space between the upper surface of horizontal wall 70 and the interior surface of frusto-conical wall 24 which surrounds the horizontal wall 70. Fluid communication between the third fluid flow passageway 86 and the first fluid flow passageway 80 is provided by slot 82.

A fourth fluid flow passageway 88 is defined as that space bounded by the interior surface of the frusto-conical wall portion 24 immediately below the longitudinal wall 66, the first continuous portion 67 of longitudinally extending wall 66, the forwardly facing middle wall surface 60 and a horizontally extending rib 89 projecting from the interior surface of frusto-conical wall portion 24 at the lowest-most portion of the middle wall member 58. Fluid communication to the fourth fluid flow passageway 88 is provided by a second slot 90 formed at the juncture of the inwardly disposed, longitudinally extending bearing support surface 30 with the bottom portion of middle wall member 58. Fluid communication with second slot 90 in turn is provided by a second pick-up director member, not shown, mounted on second mounting holes 91 at the rearwardly facing middle wall surface 59 (FIG. 3).

OPERATION

Referring now to FIGS. 3 and 5 which illustrate the carrier housing 10 mounted in a right-side up position, there is marked thereon the static lubricant level 94 within the carrier and lubricant flow paths in a forward and rearward direction of the axle mechanism, "RF" and "RR," respectively. In the forward direction, lubricant is directed by first pickup director member 83 which extends horizontally over a portion of the circumference of the right hand half 41 of the differential case into slot 82. Lubricant flows through slot 82 into first flow passageway 80 and into the differential case through opening 81. In multispeed axles, flow returns to the sump in a known manner through a clearance (not shown) between the sliding clutch (not shown) controlled by the axle shift mechanism 18 and the gear support case 19 (FIG. 1). In single speed axles (FIG. 2) the lubricant, in effect, remains entrapped in the right hand and left hand halves of the differential 41,42 at high speeds because of centrifugal force and the differential, itself, acts as if it were a sump. At slow speeds or when the axle mechanism is at rest, lubricant drains through a clearance 99 between the left hand bearing 33 and the left hand output shaft 46. Flow always returns to the axle sump in this manner independent of any of the flow paths leading to the differential.

In right-side up reverse drive direction, lubricant is picked up from the sump by the ring gear 16 and splashed onto the upper surface of horizontal wall 70 in third fluid flow passageway 86. From third flow passageway 86, lubricant falls by gravity and splashes onto the first pick-up director member 83 which guides same into slot 82 and from thence into the first flow passageway 80. The rotation of the ring gear to produce drive in a rearward direction is indicated by arrow 97 in FIG. 5 and the rotation of the drive pinion gear 14 to produce rearward drive is indicated by arrow 100 in FIG. 3.

Figure 6:
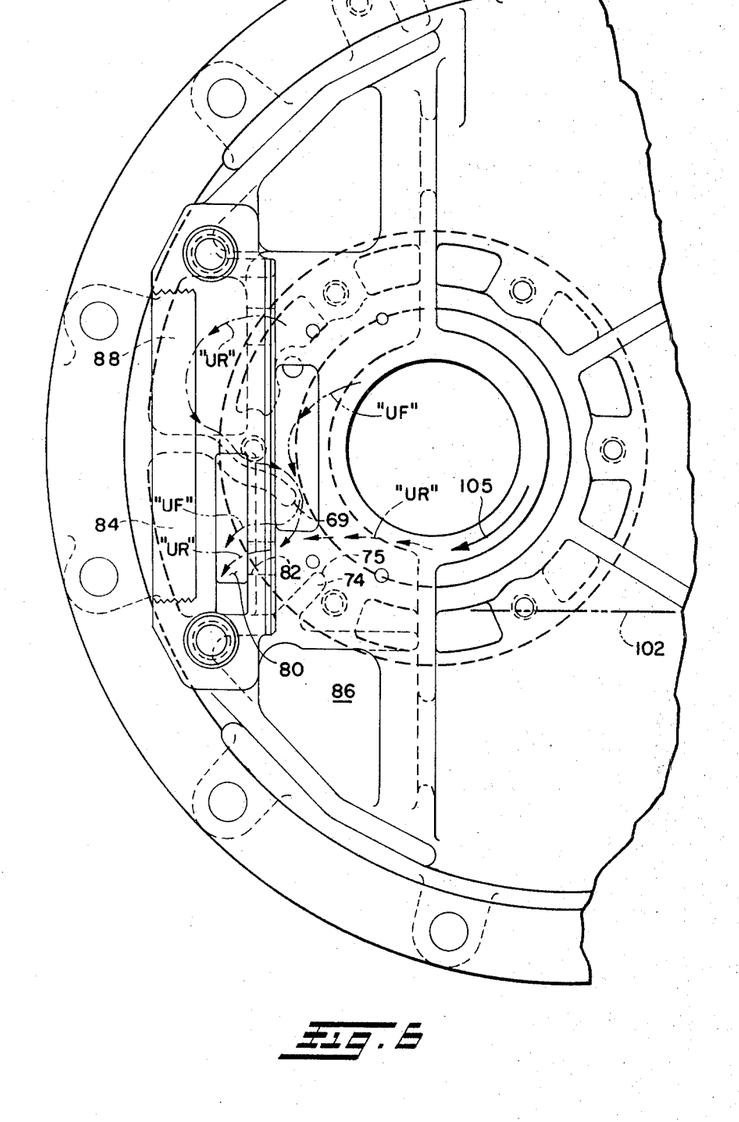
FIGS. 6 and 7 are views similar to FIGS. 3 and 5 respectively but showing the carrier housing orientated in an upside down position with forward and rearward lubricant paths marked thereon.
Figure 7:
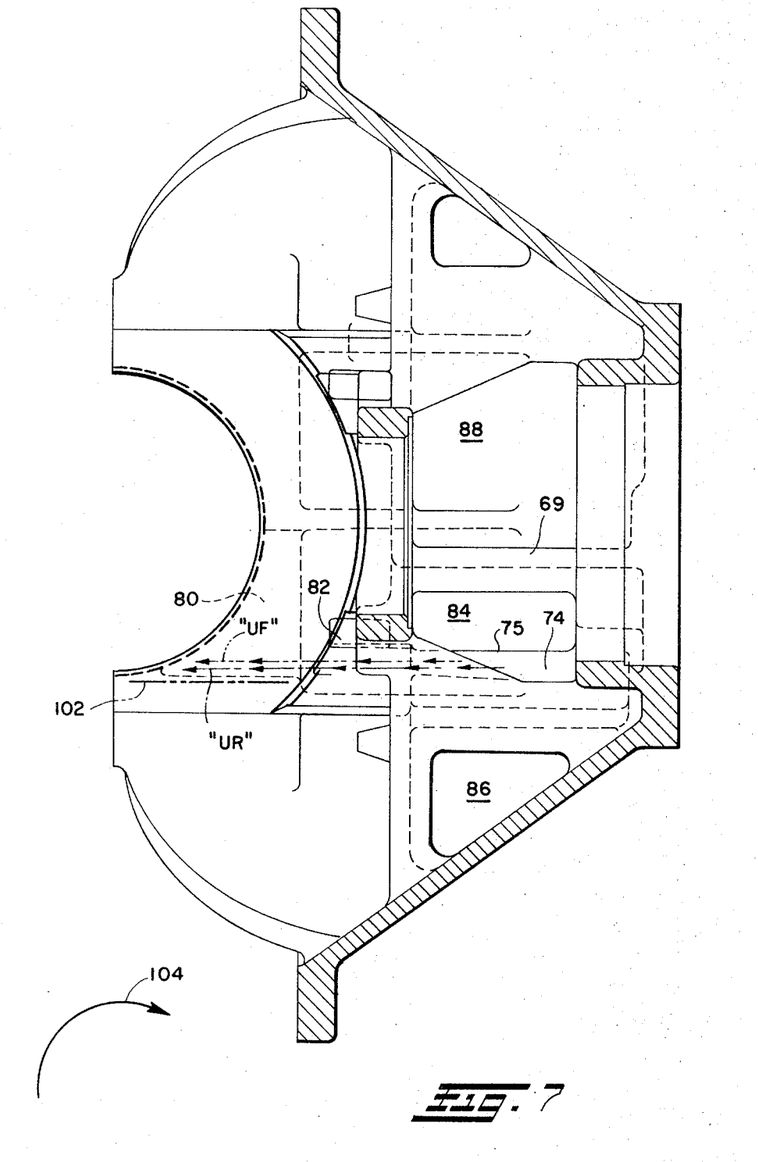

FIGS. 6 and 7 show the carrier and axle housing 10 mounted in an upside down position with arrow 104 in FIG. 7 indicating ring gear rotation and arrow 105 in FIG. 6 indicating the drive pinion gear rotation for rearward drive and the forward and rearward fluid flow paths, "UF" and "UR," marked on both figures. The static fluid level 102 of the sump is shown in both figures and FIG. 6 shows that the angular wall 74 prevents the sump from communicating with the second and first flow passageways 84,80.

The upside down forward flow path, "UF," is defined by lubricant picked up from the sump by the drive pinion gear 14 and thrown into the second flow passageway 84 between the longitudinally extending edge surface 69 of the first longitudinal wall and the longitudionally extending edge surface 75 of angular wall 74. Lubricant then travels from the second flow passageway 84 to the first flow passageway 80 and into the differential through opening 81.

In the upside down reverse drive direction, "UR," lubricant is picked up from the sump by the drive pinion gear 14 and thrown into the second fluid flow passageway 84.

In some axle applications, it has been found that the drive pinion size is such that an insufficient amount of lubricant is supplied when the axle mechanism is driven in reverse. To provide more lubricant flow to the differential, the second pick-up director member is provided. Thus the "UR" flow could also include secondary flow directed by the second pickup through slot 90 and from thence to the fourth fluid flow passageway 88; the lubricant flow falling by gravity over the first longitudinally extending wall 66 into the second flow passageway 84 and from thence to the first flow passageway 80.

The passage means include top and bottom passages 110,111 respectively formed in the hub portion 112 of the carrier which defines opening 23 in the forward end 20 thereof. The passage means also includes diametrically opposed, radially outwardly extending slots 113 in the bearing cage flange 50 which communicate with transversely extending, drain passages 114 in the pinion bearing support portion 22 of the carrier. In right-side up position with axle mechanism rotating in a forward direction, lubricant is picked up by the ring gear 16 from the sump and directed against the interior surface of the frusto-conical wall portion immediately adjacent top passage 110. Lubricant then drains through the rearward, pinion shaft bearing to return and also through the forward, companion shaft bearing and to return via the lower slot 113 and passage 114. In reverse, forward direction lubricant is washed up to the bearings through lower passage 111 by the ring gear and then to return as noted.

In an upside down mounting, the foregoing procedure is reverse.

Certain aspects of the above described lubrication system should be particularly noted. One such aspect is that while the lubricant may be picked up from the sump and thrown with a particular velocity (dependent upon the rotational speed of the axle mechanism) into a selective flow passageway, once the lubricant reaches such passageway, communication with differential opening 81 is assisted by gravity. Furthermore, while the carrier housing structure has been defined in a precise manner, it will be clear to one skilled in the art that several variations to such structure can be made without departing from the scope of the invention. Thus it is not necessary that the housing have a peripherally extending frusto-conical wall configuration 24. Nor is it necessary that the housing have an angular wall 74 in that the wall could be vertical and still serve to trap the sump lubricant from the second passageway and thus permit lubricant to exist at a higher level in the second passageway than in the sump.

The invention has been described with reference to a preferred embodiment. Obviously modifications and alterations other than those noted will occur to others upon reading and understanding of the specification. It is my intention to include all such modifications and alterations insofar as they come within the scope of the present invention.

It is thus the essence of the invention to provide a modification to a component part of an axle assembly which permits the axle assembly to be used in a wide variety of applications.

Having thus defined my invention, I claim:

1. An axle mechanism comprising:
    an axle housing capable of being mounted in one of two positions and having an opening extending therein;
    a differential carrier housing mounted on said axle housing and extending within said opening;
    said carrier housing carrying a drive pinion gear, a ring gear in meshing, driving engagement with said drive pinion gear, and a differential secured to said ring gear and including a pair of output members extending therefrom, said ring gear and differential secured to said carrier by first and second bearings through which said output members extend;
    a sump within said axle housing and extending within said carrier housing, said sump having a static level sufficient to submerge a portion of said ring gear, said drive pinion, and said differential;
    means within said carrier housing defining
        a. a first fluid flow path for directing lubricant within said carrier to said differential when said axle housing is positioned in its first position and said axle mechanism is driven in a forward direction,
        b. a second fluid flow path for directing lubricant from said ring gear to within said differential when said axle housing is positioned in its first position and said axle mechanism is driven in a reverse direction,
        c. a third fluid flow path for directing lubricant from said drive pinion to within said differential when said axle housing is positioned in its second position and said axle mechanism is driven in a forward direction,
    and
        d. a fourth lubricant flow path for directing lubricant from said drive pinion gear to within said differential when said axle housing is positioned in its second position and said axle mechanism is driven in a rearward direction.

2. The axle mechanism of claim 1 wherein said first, second, third, and fourth flow paths are each different from one another.

3. The axle mechanism of claim 2 wherein said carrier housing has a forward portion extending outside of said axle housing and a rearward portion extending within said axle housing;

said rearward portion defined by first and second generally semi-circular bearing support portions, said first and second bearing support portions orientated generally vertically and extending longitudinally towards said forward portion and adapted to receive said first and second bearings for supporting said differential and ring gear;

said first bearing support having an openended, longitudinally extending first passageway extending therethrough, said differential having an opening therein and communicating with said first passageway at the rearward end of said carrier housing;

said first bearing support portion further having a slot in one of its longitudinally extending wall surfaces, said slot communicating with said first passageway; and all of said flow paths entering said first passageway and said first and second flow paths defined in part as entering said first passageway through said slot.

4. The axle mechanism of claim 3 wherein said carrier housing further includes a generally horizontal middle wall portion spaced from the forward end of said carrier housing and continuous at its rearward facing surface with said bearing support portions, said bearing support portions being adjacent the horizontal extremities of said middle wall portion, said middle wall surface having an opening therein and a third bearing positioned within said middle wall opening for supporting a pilot end of said drive pinion gear;

said first passageway having its forward open end defined as coplanar with said middle wall;

said carrier housing further having an annular bearing support portion at said forward portion defining an opening in the forward end of said carrier housing; and first and second wall means between said forward end of said carrier housing, and the surface of said middle wall portion facing said forward end and said first and second wall means and the exterior portion of said carrier housing adjacent said first and second wall means defining a second passageway, said second passageway communicating with said forward end of said first passageway to define a portion of said third and fourth flow paths.

5. The axle mechanism of claim 4 wherein the exterior surface of said forward portion of said carrier housing includes said annular bearing support portion, said annular bearing support portion terminating in a generally frusto-conical wall portion having substantially straight sides, said frusto-conical wall portion converging in a generally annular mounting flange whereby said carrier housing is permanently mounted to said axle housing;

said first wall means includes a first longitudinally orientated wall extending between said annular bearing support portion and said middle wall portion, said longitudinal wall having first and second continuous portions, said first portion extending horizontally from the interior of said frusto-conical wall portion and said second wall portion of said first longitudinal wall extending upwardly from said first portion and being generally curvilinear with respect thereto, and said second wall portion terminating in a longitudinally extending edge surface;

said second wall means includes a second generally horizontally orientated wall portion continuous with interior surface of said frusto-conical wall portions, said second wall extending longitudinally between said annular bearing support portion and said middle wall portion and removed vertically from said first wall and the space between the upper surface of said second horizontal wall portion and the interior surface of said frusto-conical wall portion defining a third passageway; and said third passageway communicating with said slot and said second flow path defined by lubricant flow from said ring gear through said third passage into said slot and through said first passageway.

6. The axle mechanism of claim 5 wherein said second wall means further includes an angular wall depending vertically from said second wall and extending horizontally towards the center of said annular bearing support opening, said angular wall terminating in a longitudinally extending edge surface, said edge surface of said angular wall positioned horizontally closer to the center of said annular bearing support opening than said edge surface of said second continuous wall portion whereby the lubricant level in said sump is prevented from communicating with said first and second passageways when said axle housing is mounted in its second permanent position; and said third flow path is defined by lubricant flow from said drive pinion gear into said second passageway through said second passageway and into said first passageway whereby said differential and first and second bearings are lubricated.

7. The axle mechanism of claim 6 wherein a second portion of said middle wall is defined to include the intersection of said middle wall with first bearing support about a portion thereof which is vertically opposed to said first flow passageway in said first bearing support;

said second portion of said middle wall, said first portion of said first longitudinally extending wall and the interior surface of said frusto-conical portion adjacent said second portion of said middle wall and said first portion of said first wall define a fourth flow passageway; and said fourth flow path defined by lubricant flow from said gear pinion head into said fourth flow passageway, about said first longitudinal wall, into said second passageway and from thence to said first passageway communicating with said differential.

8. The axle mechanism of claim 7 wherein a second slot is provided in said longitudinally extending wall surface of said first bearing support containing said first slot, said second slot located in said wall vertically removed from said first slot and adjacent said fourth flow passageway;

a first pick-up director member mounted on said rearward facing surface of said middle wall adjacent said first slot and a second pick-up member mounted on said rearward facing surface of said middle adjacent said second slot, both pick-up director members adapted to contact said differentail case for directing lubricant into their respective slots;

and said fourth flow path further including lubricant directed from said second pick-up director into said second slot, to said fourth passageway about said first longitudinal wall into said second passageway and from thence into said first passageway communicating with said differential.

9. The axle mechanism of claim 8 wherein
passage means are provided in said annular bearing support portion for directing lubricant from said ring gear to third and fourth bearings journalling said drive pinion gear in said annular bearing support opening, said passage means being effective to lubricate said fourth bearing in either said first or second axle positions.

10. In a differential carrier housing adapted to be mounted to an axle housing and carrying a drive pinion, a differential, a ring gear and associated bearings for journalling same therein, said carrier housing including a forward end and a rearward end, an annular bearing support portion at its forward end, an annular mounting flange spaced from said annular bearing support portion, a peripherally extending exterior wall surface diverging from said annular bearing support portion and converging with said annular mounting flange, first and second semi-circular bearing support portions at said rearward end and longitudinally extending towards said forward end and blending with said annular flange, a horizontally orientated middle wall within said carrier housing spaced from said forward end and blending with said first bearing support, and lubricating means within said carrier housing adapted to provide lubricant to said axle mechanism, said first lubricating means including an open-ended, longitudinally extending first passageway within said first bearing support, the improvement comprising:
an angular wall mounted between said forward end and said middle wall extending horizontally and vertically towards the center of the opening in said annular bearing support portion whereby said carrier housing will provide lubricating means for the axle mechanism when said housing is mounted in either a right-side up or upside down position.

11. The differential carrier housing of claim 10 further including
a generally horizontally orientated wall within said carrier housing continuous with the interior of said exterior wall surface and longitudinally extending between said carrier forward end and said middle wall, said horizontal wall also continuous with said angular wall and intersecting same and said middle wall defining a flow passageway between the interior surface of said external wall surface and the outer surface of the horizontal wall whereby said passageway is adapted to serve as a lubricant flow control path.

* * * * *